W. J. O'CONNOR.
TAP FILTER.
APPLICATION FILED AUG. 13, 1912.

1,078,370. Patented Nov. 11, 1913.

UNITED STATES PATENT OFFICE.

WILLIAM J. O'CONNOR, OF NEW YORK, N. Y.

TAP-FILTER.

1,078,370.

Specification of Letters Patent. Patented Nov. 11, 1913.

Application filed August 13, 1912. Serial No. 714,778.

*To all whom it may concern:*

Be it known that I, WILLIAM J. O'CONNOR, a citizen of the United States, residing at New York, county of New York, and State of New York, have invented certain new and useful Improvements in Tap-Filters, fully described and represented in the following specification and the accompanying drawings, forming a part of the same.

This invention relates to filters for filtering water or other liquids, and more especially to water filters intended to be screwed or otherwise attached to service faucets or cocks.

The invention aims to provide a filter of this kind suitable for general household or other use which shall be so constructed that the cloth or other filtering material may be readily placed in position and renewed from time to time, and which shall be simple and inexpensive in construction and efficient in operation.

A full understanding of the invention can best be given by a detailed description of a filter made to embody the invention in an approved form, and such a description will now be given in connection with the accompanying drawings, in which:—

Figure 1:
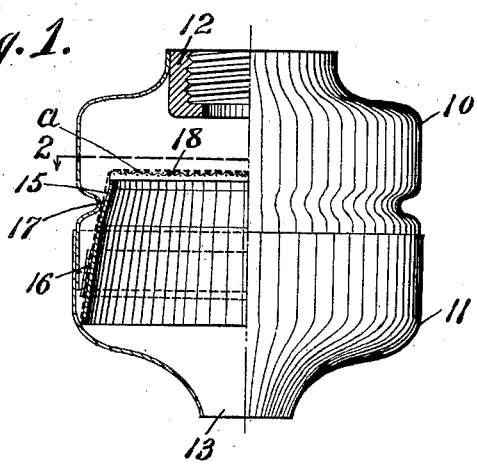
Figure 2:
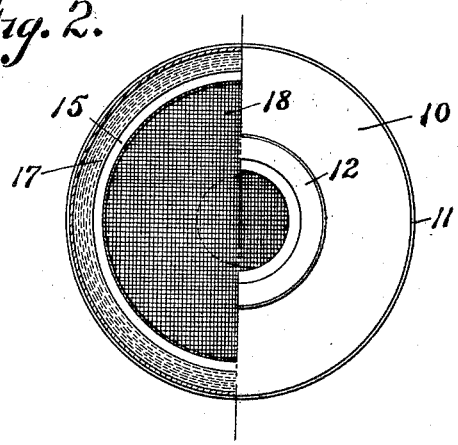

Figure 1 is a view of such a filter partly in elevation and partly in central longitudinal section; and Fig. 2 is a plan view partly in section on line 2 of Fig. 1.

Referring to the drawings, the body or casing of the filter as shown is of cylindrical form with reduced ends providing the inlet and outlet openings, and is made up of two separable sections 10 and 11, the upper section 10 being formed with a reduced upper end arranged to be screwed or otherwise attached to a water faucet, as by being provided with an interiorly threaded socket piece or neck 12 set into the end of the casing section, and the lower section 11 being formed with a reduced lower end having a discharge opening 13. The casing sections may be formed in any suitable manner and of any suitable material, but they are best made of comparatively thin sheet copper or brass or other suitable metal spun or otherwise shaped to the desired form; and the sections are made to telescope together, the lower portion of the upper section 10 fitting tightly within the open upper end of the lower section 11 to make a substantially water-tight joint. This arrangement provides a simple way of securing the sections together so that the parts may be readily separated and assembled; and by forming the section so as to overlap a considerable distance and to fit tightly together they will be held together by friction against any ordinary water pressure.

The filter shown is intended for using cloth or other suitable sheet filtering material. The filtering material is supported by an annular support 15 which will usually be made of comparatively thin metal and is removable from the casing for the purpose of removing and replacing the filtering material thereon; and the filtering material is placed and secured in position on the support by being placed over the upper edge of the support and drawn down and clamped against the sides of the support by an annular holding band or ring 16, as indicated by the dotted line *a* in Fig. 1. The support when in position rests on and is supported by the lower casing section 11 and extends upward when the casing sections are closed together into the upper section 10 and past an annular shoulder 17 projecting inwardly from the wall of the casing section 10, this shoulder being formed when the casing section is of sheet metal by an inward band or a fold of the metal as shown in Fig. 1. The support 15 should best be of upwardly and inwardly tapering form with, preferably, a somewhat sharper incline or taper near its upper edge, and is of such size or diameter that when the parts are assembled the shoulder 17 will press against the filtering material drawn down over the inclined side of the support to form a substantially water-tight joint between the wall of the casing section 10 or shoulder 17 and the support 15. In order that the filtering material stretched over the open upper end of the support 15 may be held as flat as possible so as to secure the best filtering action, the support is provided at its upper edge with a sustaining covering 18 of wire mesh or other suitable perforate material.

To prepare the filter for use it is only necessary to secure the cloth or other filtering material, in one or more layers as desired, over the support 15, then place the support in either the lower or the upper casing section and force the casing sections together to the closed position as shown in Fig. 1. The filter is then ready to be screwed on to the faucet for use. To renew the filtering material, it is only necessary to pull off the lower casing section, remove the support 15, renew the filtering material thereon, and replace the support and close the casing sections together; and this may be done if desired without removing the upper casing section from the faucet.

It will be noticed that the layer or diaphragm of filtering material is supported in position to divide the interior of the casing in a plane above the joint between the casing sections into an inlet chamber and an outlet chamber, and that, therefore, the water does not tend to escape through the joint between the sections under the inlet pressure, but that it is only water in the outlet chamber or water under no or practically no pressure which can reach the joint. There will be little if any tendency, therefore, for water to escape through the joint, and, furthermore, any water which might escape through the joint will be filtered water. Since the cloth around the sides of the support 15 is pressed tight against the support by the shoulder 17, any water which might pass between the shoulder and the support will be just as thoroughly filtered as that passing through the filtering material stretched over the top of the support. The bottom edge of the support will not make such a tight fit with the casing section 11 as to prevent the passage of any water which might leak past the shoulder 17. If found desirable, special openings might be provided for the passage of any such water from the space between the support and the wall of the casing. It should be noted, also, that when the parts of the casing are forced together the shoulder 17, as the upper part of the support is forced upward past and against the shoulder, will act to draw the material more tightly over the support and then hold it by clamping it against the sides of the support, and will also aid in sustaining the support.

It will be understood that the invention is not to be limited to the exact construction and arrangement of the parts shown, but that it includes changes and modifications thereof within the claims. It will be understood, also, that although the filter will usually be used in a vertical position with the filtering diaphragm standing horizontal, this being considered at the present time the best position for use, yet the filter might be used in other positions, and the expressions "upper casing section" and "lower casing section" and other similar expressions used herein are not to be considered as limiting the construction claimed to a vertically arranged filter or one intended to be used in vertical position.

What is claimed is:

1. A filter comprising in combination a casing formed of upper and lower separable telescoping sections of sheet metal, the upper section having an inlet formed by a threaded socket piece and the lower section having an outlet opening, a support for filtering material formed of sheet metal and having upwardly and inwardly tapering side walls and open ends and adapted to rest within and against the lower casing section and to extend upward within the upper casing section and having means at its upper end for sustaining the filtering material, and a holding band formed to slip over the support to hold a sheet of filtering material stretched over the upper edge of the support, the upper casing section being formed to engage the filtering material on the support to make a substantially water-tight joint between the support and the side of the upper casing section.

2. A filter comprising in combination a casing having a separable lower portion, a support for filtering material open at its upper end and extending upward from the lower portion of the casing, and an inwardly extending shoulder on the casing wall in position to engage sheet filtering material extending over the top of the support and about the sides thereof when the casing is closed and the support pressed upward in the casing to stretch the filtering material over the top of the support and hold it against the sides of the support and to make a substantially water-tight joint between the support and the casing.

In testimony whereof, I have hereunto set my hand in the presence of two subscribing witnesses.

WILLIAM J. O'CONNOR.

Witnesses:
    A. L. KENT,
    D. A. DAVIES.

Copies of this patent may be obtained for five cents each, by addressing the "Commissioner of Patents, Washington, D. C."